(12) United States Patent
LaDue

(10) Patent No.: US 6,292,711 B1
(45) Date of Patent: Sep. 18, 2001

(54) DOCUMENT DISPENSER COMPANION DOCUMENT DATA DOWNLOADING

(75) Inventor: Philip G. LaDue, Bellbrook, OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 08/962,958

(22) Filed: Nov. 4, 1997

Related U.S. Application Data

(63) Continuation-in-part of application No. 08/609,506, filed on Mar. 1, 1996, now abandoned.

(51) Int. Cl.[7] ................................................. G06F 17/60
(52) U.S. Cl. ..................... 700/241; 700/233; 700/235; 705/14; 705/16; 705/45
(58) Field of Search .................................. 700/244, 231, 700/233, 234, 235, 241, 232; 705/30, 35, 42, 34, 44, 45, 16, 14, 24, 29, 40; 235/379, 381

(56) References Cited

U.S. PATENT DOCUMENTS

| | | | |
|---|---|---|---|
| 4,918,604 | 4/1990 | Baum | 221/5 |
| 5,173,851 | 12/1992 | Off et al. | 705/14 |
| 5,317,646 | 5/1994 | Sang, Jr. et al. | 382/175 |
| 5,319,562 | 6/1994 | Whitehouse | 705/40 |
| 5,347,451 | 9/1994 | Fujiwara et al. | 705/16 |
| 5,349,534 | 9/1994 | Rousseff et al. | 700/235 |
| 5,477,037 | 12/1995 | Berger | 235/379 |
| 5,552,994 | 9/1996 | Cannon et al. | 700/95 |
| 5,555,496 | 9/1996 | Tackbary et al. | 705/27 |
| 5,563,999 | 10/1996 | Yaksich et al. | 707/507 |
| 5,583,778 | 12/1996 | Wind | 705/34 |
| 5,596,738 | 1/1997 | Pope | 711/103 |
| 5,625,776 | 4/1997 | Johnson | 705/27 |
| 5,774,879 * | 6/1998 | Custy et al. | 705/35 |
| 5,835,689 * | 11/1998 | Braun et al. | 358/1.14 |
| 5,893,080 * | 4/1999 | McGurl et al. | 705/40 |
| 5,909,673 * | 6/1999 | Gregory | 705/45 |

* cited by examiner

*Primary Examiner*—William Grant
*Assistant Examiner*—Paul Rodriguez
(74) *Attorney, Agent, or Firm*—Killworth, Gottman, Hagan & Schaeff LLP

(57) ABSTRACT

A document dispensing system comprising a companion document data transfer device and a document dispenser having a document variables data input terminal, a document printer, a digital data input port coupled to the companion document data transfer device, a companion document data memory, an operational program memory, and a digital controller programmed to store new companion document data in the companion document data memory and to control the document printer in accordance with the document variables data, the new companion document data, and the operational program data. Replacement companion document data is downloaded from the data transfer device to the companion document data memory via the digital data input port.

16 Claims, 3 Drawing Sheets

DOCUMENT DISPENSER COMPANION DOCUMENT DATA DOWNLOADING

CROSS REFERENCE TO RELATED APPLICATIONS

This application is a Continuation-in-Part of U.S. patent application Ser. No. 08/609,506, filed Mar. 1, 1996, now abandoned.

Reference is made to three (3) appendices hereto, submitted in duplicate in compact disc-readable (CD-R) format. The first appendix (Appendix A) includes the following seven (7) files (with accompanying size and date): 8032.h (10 kB, Dec. 11, 1997); Checksum.c (3 kB, Mar. 14, 1996); Comm.c (66 kB, Feb. 13, 1998); Eprom.c (21 kB, Jul. 13, 1995); Flash.c (6 kB, Mar. 14, 1996); Io.h (6 kB, Aug. 15, 1996); Xrecv.c (13 kB, Mar. 14, 1996). The second appendix (Appendix B) includes the following six (6) files: 8032.h (10 kB, Dec. 11, 1997); Checksum.c (3 kB, Mar. 14, 1996); Comm.c (66 kB, Feb. 13, 1998); Data.h (29 kB, Mar. 6, 1998); Io.h (6 kB, Aug. 15, 1996); Op_proc.c (49 kB, Mar. 16, 1998). The third appendix (Appendix A) includes the following four (4) files: Badbell (1 kB, Feb. 1, 1996); Goodbell (1 kB, Feb. 1, 1996); Reprog (10 kB, Feb. 1, 1996); Talk_mod.c (29 kB, Jun. 19, 1995).

BACKGROUND OF THE INVENTION

The present invention relates to document dispensing systems and, more particularly, to document dispensing systems including a digital controller which controls the operation of the dispenser according to an predetermined operational program.

Conventional digitally controlled document dispensers and document dispensing systems operate according to a software program stored in an integrated circuit memory installed in the dispenser electronics. Because of the permanent nature of the integrated circuit installation, the variety of dispensable documents is limited to the characteristics defined in the program resident in a program storage area. For example, although certain document variables may be specified and changed by an operator of a conventional dispenser, if a dispenser operator wishes to print a completely new document type, the conventional dispenser, or its program storage device, must be replaced or physically modified.

A dispenser operator may wish to dispense a primary document, e.g., a money order, and intermittently print a companion document, e.g., a merchandise coupon, an advertisement, a news release, etc. Further, the dispenser operator may wish to frequently change the characteristics of the companion document. Finally, the operator may wish to have the capability to print companion documents having uncontemplated, unpredictable, and updatable appearances. The conventional dispenser, described above, including the stored operational program specifying a predetermined set of document characteristics, does not provide a means by which a dispenser operator could conveniently achieve these tasks.

Accordingly, the conventional document dispenser is not well suited for operating environments which require intermittent selection and alteration of companion document types and companion document characteristics. Indeed, there is a need for a document dispensing system having the ability to change the graphics and data represented on companion documents in response to changing business needs.

SUMMARY OF THE INVENTION

This need is met by the present invention wherein updated companion document data is downloaded to the memory of a digitally controlled document dispenser or to each memory of a group of digitally controlled document dispensers.

In accordance with one embodiment of the present invention, a financial document dispenser is provided comprising a digital bus, a document variables data input and selection device, a magnetic ink character recognition (MICR) laser printer, a digital data input port, an operational program storage device, a companion document data storage device, and a digital controller. The document variables data input and selection device is coupled to the digital bus. The MICR laser printer is coupled to the digital bus and is operative to print a financial document including MICR characters and a companion document. The MICR laser printer includes a single supply of printer paper, is operative to produce a selected document wherein substantially all printing which defines the selected document is printed on the printer paper at the time the document is issued, and is operative to produce a variety of distinct documents from the single paper supply. The digital data input port, the operational program storage device, the companion document data storage device, and the digital controller are coupled to the digital bus. The digital is programmed to cause the document printer to print the financial document in response to document variables data input and selected at the document variables data input and selection device. The document variables data corresponds to financial document data. The digital controller is further programmed to cause companion document data received at the digital data input port to be stored in the companion document data storage device and cause the document printer to print a companion document in response to the companion document data received at the digital data input port and stored in the companion document data storage device.

In accordance with another embodiment the present invention, a document dispenser is provided comprising: a digital bus; a document variables data input and selection device coupled to the digital bus; a document printer coupled to the digital bus; a digital data input port coupled to the digital bus; an operational program storage device coupled to the digital bus; a companion document data storage device coupled to the digital bus; and, a digital controller coupled to the digital bus, programmed to cause companion document data received at the digital data input port to be stored in the companion document data storage device, and programmed to control the document printer in accordance with the document variables data, the operational program data, and the companion document data.

The document variables data input and selection device may comprise a dispenser keyboard or a communications port. The digital data input port may comprise a communications port. Further, the digital data input port may be coupled to a file storage device which stores companion document data and enables transfer of the companion document data to the digital data input port.

The companion document data storage device may comprise an erasable programmable memory, a data storage device mounted within a personal computer, or a personal computer readable data storage disk.

The digital controller may further be programmed to replace companion document data resident in the companion document data storage device with new companion document data. The companion document data comprises the complete set of companion document dispensing data.

The document variables data may comprise a user-selected set of values corresponding to a predetermined set of document variables.

In accordance with yet another embodiment of the present invention, a method of dispensing documents is provided comprising the steps of: providing at least one document dispenser having a digital data input port and a companion document data storage device; providing an companion document data transfer device; and, downloading companion document data from the data transfer device to the companion document data storage device via the digital data input port. The at least one document dispenser may comprise a plurality of document dispensers and the downloading step may comprise selectively downloading the companion document data to the plurality of dispensers.

In accordance with yet another embodiment of the present invention, a document dispensing system is provided comprising: a companion document data transfer device; a document dispenser having a document variables data input and selection device, a document printer, a digital data input port coupled to the companion document data transfer device, an operational program storage device, a companion document data storage device, and a digital controller programmed to store companion document data, sent from the companion document data transfer device to the digital data input port, in the companion document data storage device and to control the document printer in accordance with the document variables data, the operational program data, and the companion document data.

The companion document data transfer device may comprise a host computer, may be located remote from the dispenser, or may be locally coupled to the document dispenser. Further, the companion document data transfer device may comprise a file storage and transfer device.

Accordingly, it is an object of the present invention to provide a document dispenser that is well suited for operating environments which require intermittent selection and alteration of companion document types and companion document characteristics. Further, it is an object of the present invention to provide a document dispensing system wherein companion documents are changed in response to changing business needs.

DETAILED DESCRIPTION OF THE INVENTION

Figure 1:
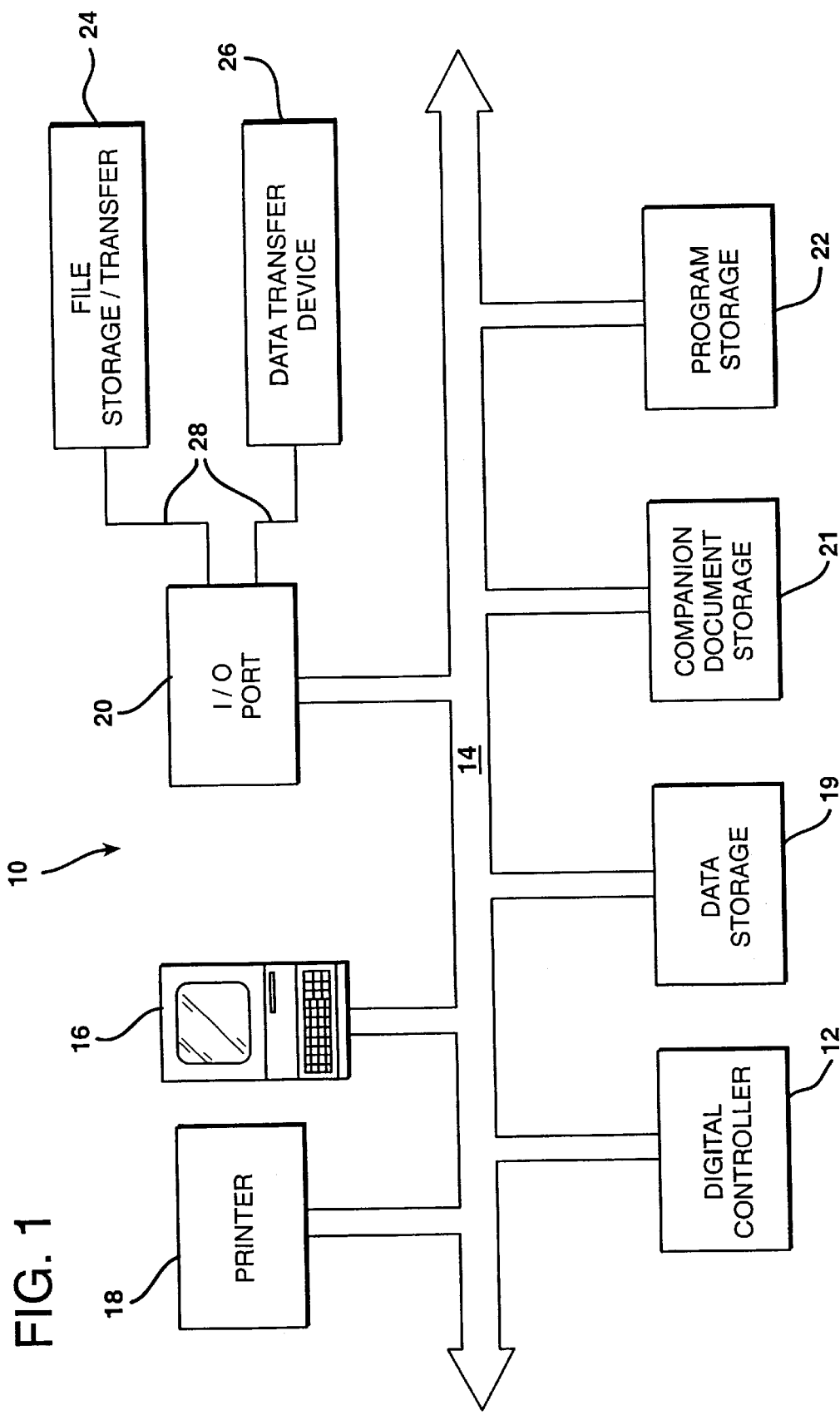
FIG. 1 is a block diagram of the components of a document dispensing system according to the present invention.

A dispensing system 10 according to the present invention will be described with reference to FIG. 1. A digital controller 12, preferably including a central processing unit (CPU), is coupled to data, address, and control buses, represented generally by the digital bus 14. A document variables data input terminal 16, a document printer 18, and a digital data input/output (I/O) port 20 are in communication with the digital controller 12 via the digital bus 14 and are controlled thereby according to various operating and applications programs resident in a companion document data storage device 21 and in a digital operational program data storage device 22. Data processed by the digital controller 12 is stored in a digital data storage device 19. The digital controller 12, digital bus 14, terminal 16, printer 18, input/output port 20, digital data storage device 19, companion document data storage device 21, and program storage device 22, will be referred to collectively herein as the document dispenser. The document dispensing system 10 includes the document dispenser components in addition to a file storage and transfer device 24, data transfer device 26, and data links 28, described below.

The document printer 18 is preferably a printer, e.g., a laser printer, where substantially all printing which defines the selected document, e.g. a primary document or a secondary document, is printed on the printer paper at the time the document is issued. In this manner, a variety of distinct documents may be produced at the single printer 18 and there is no need to provide a plurality of printers or printing stations within the document dispensing system 10. According to one embodiment of the present invention, the printer 18 comprises a MICR laser printer and, as such, is operative to print financial documents including MICR characters.

The document variables data input terminal 16 typically comprises a data communications port, a keypad, or a keyboard. A dispenser operator selects a set of document variable values according to the requirements of a particular primary document and enters the selected values at the terminal 16. For example, in the event the document dispenser is utilized primarily to dispense a financial document such as a money order, the operator will typically select a money order amount, a payor name, a payee name, a document date, etc. The selected values are then entered at the document variables data input terminal 16. A dispenser operator also uses the terminal 16 to select a companion document 40 for dispensing with the primary document 42, see FIG. 3. The appearance of the companion document 40 is determined in accordance with the companion document data stored in the companion document data storage device 21. For example, depending upon the companion document data stored, the operator can instruct the dispenser to print a merchandise coupon, an advertisement, or a news release, to accompany the primary document 42. According to one embodiment of the present invention, the printer 18 comprises a single MICR laser printer capable of printing a financial document and a suitable companion document 40. According to this aspect of the present invention, an additional printer 18 need not be provided to enable printing of the companion document 40.

The companion document data storage device 21 and the operational program storage device 22 are in communication with the digital controller 12 via the digital bus 14 and typically comprise erasable programmable memories, preferably FLASH memories, hard disk drives of a personal computer, or floppy disk drive units. It is contemplated by the present invention that the companion document data storage device 21 and the operational program data storage device 22 may comprise a single memory device storing both sets of data. It is also contemplated by the present invention that a personal computer coupled to a printer could be modified to form the components of the document dispenser described above.

The digital controller 12 incorporates a digital data storage device 19 for providing storage of data processed by the digital controller 12. It is contemplated by the present invention that the digital data storage device 19 may be incorporated in the structure of the digital controller 12. Similarly, the data processed by the digital controller may be stored in the companion document data storage device 21, the operational program storage device 22 or a memory device equipped to store the operational program data and the data processed by the digital controller. Finally, it is noted that the storage devices illustrated in FIG. 1 are indicated as separate structural elements for clarity and it is contemplated by the present invention that the storage devices may be grouped into one or more storage devices having storage areas designated for the distinct storage types.

The file storage and transfer device 24 is coupled to the digital data input/output port 20 through the data link 28. The file storage and transfer device 24 is arranged to store companion document data and to enable transfer of the companion document data to the digital data input/output port 20. Similarly, the data transfer device 26 is coupled to the digital data input/output port 20 through the data link 28 and is arranged to store and transfer document dispenser companion document data. The file storage and transfer device 24 may be a floppy disk drive unit including a data storage disk carrying companion document data. The data transfer device 26 may be a host computer coupled to the document dispenser or any peripheral device capable of producing, transferring, or retrieving companion document data. The data input/output port 20 is an RS-232 serial port, a telecommunications port, a parallel port, or any other data connection to the file storage and transfer device 24 and/or the data transfer device 26. The data link 28 may be any type of data carrying connector, e.g., a parallel data cable, an RS-232 serial cable, a telephone line, a fiber-optic data link, or an electromagnetic radiation transmitter/receiver data link. The file storage and transfer device 24 and the data transfer device 26 may be locally coupled to the input/output port 20 through, for example, a serial or parallel cable, or remotely coupled to the dispenser through, for example, a telecommunications connection.

The digital controller 12 is programmed to cause companion document data received at the digital data input port 20 to be stored in the companion document data storage device 21. An example of source code representing a downloading process whereby data received at a digital data input port may be downloaded to a dispenser memory is presented in appendices A, B, and C. Further, the digital controller 12 is programmed to control the document printer 18 in accordance with the companion document data stored in the companion document data storage device 21, the operational program data stored in the operational program data storage device 22, and the document variables input at the terminal 16. The particular companion document data and operating program selected for use in the document dispenser is outside the scope of the present invention and, as will be appreciated by one of ordinary skill in the art of document dispensing, a variety of document dispenser operational programs are widely known and used throughout the document dispensing industry. Selection of one particular companion document type or operational program depends upon the types of documents an operator wishes to dispense and upon the preferences of the dispenser operator.

The document dispensing system 10, arranged as described above, enables a dispensing system operator to download new companion document data from the data transfer device 26 or the file storage and transfer device 24 to the document dispenser as business needs change. Specifically, the digital controller 12 is programmed to replace dispenser companion document data resident in the companion document data storage device 21 with new companion document data transferred to the input/output port 20. The downloaded companion document data preferably comprises the complete set of companion document data.

Figure 3:
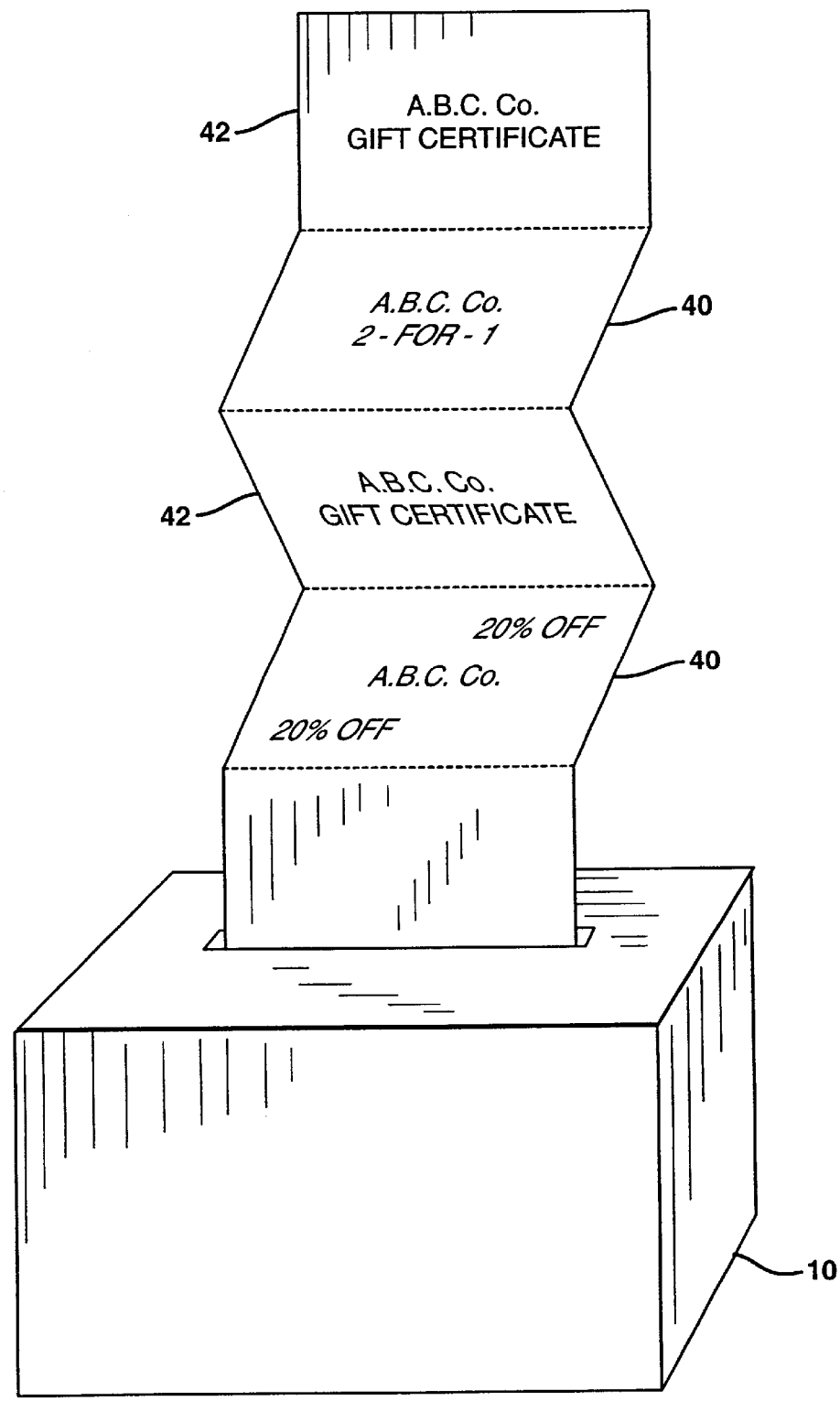

As is illustrated in FIG. 3, when new companion document data is downloaded to the companion document data storage device 21 of the dispenser 10 in the manner described above, a dispenser operator has the ability to successively print different companion documents 40 accompanying separate primary documents 42.

Figure 2:
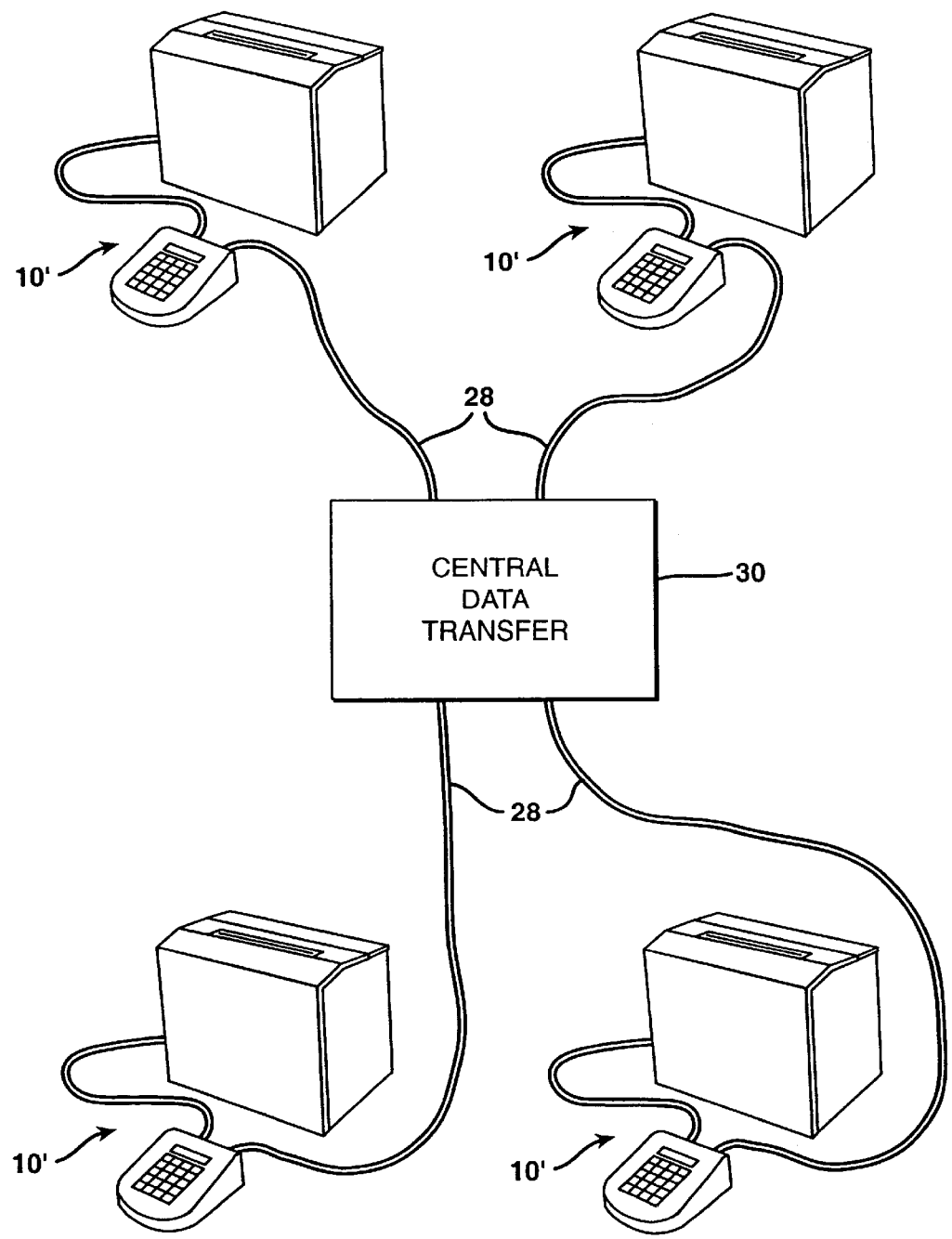
FIG. 2 is an illustration of an alternative embodiment of a document dispensing system according to the present invention; and, FIG. 3 is an illustration of a succession of documents printed in accordance with the present invention.

As illustrated in FIG. 2, where like elements are referenced by like reference numerals, the file storage and transfer device 24 and/or the data transfer device 26, represented generally by a central data transfer device 30, may be connected via data links 28 to a plurality of input/output ports corresponding to a plurality of document dispensers 10'. In this manner, companion document data may be transferred from the central data transfer device 30 to a plurality of document dispensers 10'.

It is contemplated by the present invention that a variety of document types may be produced by the document dispenser of the present invention. Specifically, financial documents, such as money orders, cashiers checks, gift certificates, security documents, etc., data reports, and any other document requiring selection and placement of printed indicia thereon may be dispensed with the system of the present invention. It is further contemplated by the present invention that the memory devices identified herein may employ electronic, magnetic, magneto-optical, electro-optical, or optical data storage without departing from the scope of the present invention.

Finally, it is contemplated by the present invention that a variety of source codes may be utilized to enable the companion document data downloading described herein. Attached as appendices A and B is an example of source code which enables a document dispenser to download data sent to the input/output port 20. The data may be sent to the input/output port 20 utilizing a variety of techniques, most commonly via a "send file" command generated in a host computer. Attached as appendix C is an example of host computer resident source code capable of sending data to the input/output port 20.

Appendix A is an example of source code resident in the program storage device 22. "COMM.C" contains routines that (i) establish or verify serial communications with a host system, (ii) receive the data that makes up the data to be downloaded, and (iii) set up and calls the routine that erases the companion document storage device 21 by banks. "XRECV.C" contains the routines that receive a block of data and build a record to pass down to "write_rec( )" in "FLASH.C" to write the data to the companion document storage device 21. "FLASH.C" resides in the program storage device 22 and contains the routines that erase the companion document storage device 21 by banks and write the download data one byte at a time. "8032.H" contains the hardware data bit declarations for the program storage device 22. "EPROM.C" contains the source code for the main processing loop of the program storage device 22 and calls jump_flash in "CHECKSUM.C" to jump and execute from the companion document storage device 21. "CHECKSUM.C" contains the routine jump flash which sets the hardware port MEMJMP to 1 which tells the hardware to execute out of the companion document storage device 21 upon setting the execution address to 0. "IO.H" masks MEMJMP to the hardware port to control the memory device from which the dispenser executes.

Appendix B is an example of source code resident in the companion document data storage device 21. "COMM.C" contains routines that jump to the program storage device 22 for downloading new data to the companion document data storage device 21 and rebuild using data received from a host system via the input/output port 20. "8032.H" contains the hardware data bit declarations for the companion document data storage device 22. "DATA.H" allocates memory for the variable names used by the files resident in the companion document data storage device 22. "OP PROC.C" contains the code that analyzes data input at terminal 16. "CHECKSUM.C" contains the routine jump_flash which sets the hardware port MEMJMP to 1 which tells the hardware to execute out of the companion document storage device 21 upon setting the execution address to 0. "IO.H" masks MEMJMP to the hardware port to control the memory device from which the dispenser executes.

In appendix C, "REPROG.BAT" is the file that resides on the host computer. Through a serial data port, "REPROG.BAT" extracts all the data to be downloaded, places the data in a file, issues a "DFLASH" command to the dispenser 10 to reprogram the companion document data storage device 21, downloads the files containing the data, verifies that the companion document data storage device 21 was successfully rewritten, and ends. "BADBELL.BAT" and "GOODBELL.BAT" are called by "REPROG.BAT." "TALKMOD.C" is used by "REPROG.BAT" to accept a string or filename to send, wait for a specified time for a response, and compare the communications response with a command-line supplied string.

Having described the invention in detail and by reference to preferred embodiments thereof, it will be apparent that modifications and variations are possible without departing from the scope of the invention defined in the appended claims.

What is claimed is:

1. A financial document dispenser comprising:
   a digital bus;
   a document variables data input and selection device coupled to said digital bus;
   a financial document printer coupled to said digital bus and operative to print a financial document;
   a digital data input port arranged to communicate with a peripheral device via an external data link, said digital data input port being coupled to said digital bus;
   an operational program storage device coupled to said digital bus;
   a companion document data storage device coupled to said digital bus; and,
   a digital controller coupled to said digital bus and, programmed to
      cause said document printer to print a financial document in response to document variables data input or selected at said document variables data input and selection device, wherein said document variables data corresponds to financial document data,
      cause companion document data received from said peripheral device at said digital data input port to be stored in said companion document data storage device, and
      cause said document printer to print a companion document in response to said companion document data received from said peripheral device at said digital data input port and stored in said companion document data storage device.

2. A document dispenser as claimed in claim 1, wherein said document variables data input and selection device comprises a dispenser keyboard.

3. A document dispenser as claimed in claim 1, wherein said document variables data input and selection device comprises a communications port.

4. A document dispenser as claimed in claim 1, wherein said digital data input port comprises a communications port.

5. A document dispenser as claimed in claim 1, wherein said digital data input port is coupled to a file storage and transfer device which stores companion document data and enables transfer of said companion document data to said digital data input port.

6. A document dispenser as claimed in claim 5, wherein said file storage and transfer device comprises a data storage device mounted within a personal computer.

7. A document dispenser as claimed in claim 5, wherein said file storage and transfer device comprises a personal computer readable data storage disk.

8. A document dispenser as claimed in claim 1, wherein said companion document data storage device comprises an erasable programmable memory.

9. A document dispenser as claimed in claim 1, wherein said digital controller is further programmed to replace companion document data resident in said companion document data storage device with new companion document data.

10. A document dispenser as claimed in claim 1, wherein said companion document data comprises the complete set of companion document dispensing data.

11. A document dispenser as claimed in claim 1, wherein said document variables data comprise a user-selected set of values corresponding to a predetermined set of document variables.

12. A financial document dispensing system comprising:
    a companion document date transfer device;
    a financial document dispenser having a document variables data input and selection device, a document printer operative to print a financial document, a digital data input port coupled to said companion document data transfer device via an external data link, an operational program storage device, a companion document data storage device, and a digital controller, wherein
       said companion document data transfer device is peripheral to said document dispenser and is arranged to transfer companion document data over said external data link, and
       said digital controller is programmed to
          cause said document printer to print a financial document in response to document variables data input and selected at said document variables data input and selection device, wherein said document variables data corresponds to financial document data,
          store companion document data in said companion document data storage device upon transfer of said companion document data from said companion document data transfer device to said digital data input port, and
          cause said document printer to print a companion document in response to said companion document data received at said digital data input port and stored in said companion document data storage device.

13. A document dispensing system as claimed in claim 12, wherein said companion document data transfer device comprises a computer programmed to store companion document data and to transfer companion document data over said external data link.

14. A document dispensing system as claimed in claim 12, wherein said companion document data transfer device is located remote from said dispenser.

15. A document dispensing system as claimed in claim 12, wherein said companion document data transfer device is locally coupled to said document dispenser.

16. A document dispensing system as claimed in claim 12, wherein said companion document data transfer device comprises a file storage and transfer device.

* * * * *

UNITED STATES PATENT AND TRADEMARK OFFICE
CERTIFICATE OF CORRECTION

PATENT NO. : 6,292,711 B1  
DATED : September 18, 2001  
INVENTOR(S) : Phillip G. LaDue Page 1 of 1

It is certified that error appears in the above-identified patent and that said Letters Patent is hereby corrected as shown below:

<u>Column 8,</u>  
Line 26, reads as "document date transfer" should read -- document data transfer --

Signed and Sealed this

Twenty-eighth Day of May, 2002

Attest:

JAMES E. ROGAN  
*Attesting Officer*   *Director of the United States Patent and Trademark Office*